United States Patent [19]

Goldberg

[11] Patent Number: 4,752,902
[45] Date of Patent: Jun. 21, 1988

[54] DIGITAL FREQUENCY SYNTHESIZER

[75] Inventor: Bar-Giora Goldberg, San Diego, Calif.

[73] Assignee: Sciteq Electronics, Inc., San Diego, Calif.

[21] Appl. No.: 752,823

[22] Filed: Jul. 8, 1985

[51] Int. Cl.$^4$ ............................................. H03B 19/00
[52] U.S. Cl. ....................................... 364/721; 328/14
[58] Field of Search ........................ 364/721; 328/14; 379/418

[56] References Cited

U.S. PATENT DOCUMENTS

| | | | |
|---|---|---|---|
| 3,727,037 | 4/1973 | Zorn | 364/721 |
| 3,735,269 | 5/1973 | Jackson | 328/14 |
| 3,813,528 | 5/1974 | Blanding | 364/721 |
| 4,039,806 | 8/1977 | Fredriksson et al. | 364/721 |
| 4,410,955 | 3/1981 | Burke et al. | 364/721 |
| 4,484,296 | 11/1984 | Treise | 328/14 |
| 4,626,787 | 12/1986 | Mefford | 328/14 |

Primary Examiner—David H. Malzahn
Attorney, Agent, or Firm—Thomas J. Tighe

[57] ABSTRACT

N stages of BCD adders receive as a first addend BCD encoded information representing a desired frequency. They receive as a second addend the outputs of N stages of four-bit registers. The summing outputs of the adders are input data for the registers. The data is clocked into the register by a stable frequency source. The outputs from a plurality of the most significant stages of the registers are used to address a ROM. Using the periodically changing BCD address, a sinusoidal function is retrieved in individual samples from the ROM. Digital data from the ROM is converted to analog. A low pass filter enhances the desired frequency and suitably attenuates higher frequencies. An equalizer compensates for power roll-off.

7 Claims, 1 Drawing Sheet

DIGITAL FREQUENCY SYNTHESIZER

BACKGROUND OF THE INVENTION

This invention relates in general to devices which are capable of synthesizing a plurality of frequencies from a single stable source frequency, and more particularly to such devices which generate sinusoidal signals from stored digital samples.

Digital frequency synthesizers of various forms and designs are known in the art, and excellent treatises on the subject have been published. One such treatise is an article entitled "A Digital Frequency Synthesizer" published in *IEEE Transactions On Audio and Electroacoustics*, Volume AU-19, No. 1, March 1971, pages 48–56, and authored by Tierney, et al. The treatise shows an input control word, representing the desired frequency, being stored in a register and used to update an accumulator each period of a stable source frequency. The accumulator addresses a read-only memory (ROM) containing samples of sinusoidal functions. Digital data from the ROM is converted to an analog signal which is then low-pass filtered. U.S. Pat. No. 3,735,269 by Jackson also mentions the Tierney, et al., treatise in its presentation of a digital frequency synthesizer. The Jackson synthesizer discloses the same basic elements as the treatise. Other common elements are some form of a complementor between the accumulator and the ROM to enable the devices to take advantage of the symmetries in sinusoidal functions, and thereby reducing the amount of memory required to store the samples.

Both the Jackson and the Tierney, et al., devices were designed at a time when the only available semiconductor ROM's were relatively expensive and small in capacity, and high-speed ROM's were even more so. At that time it was highly desirable to create designs which minimized ROM requirements, and the Jackson and Tierney, et al., devices reflect that minimization.

This invention takes unique advantage of the current availability of relatively inexpensive and large capacity ROM's. By using such a ROM, the complexity of the circuit and the number of components used to perform the same or similar functions are greatly reduced. This is so because samples covering an entire period of a sinusoidal function are stored in the ROM rather than one-half or one-quarter of a period as in the prior art. This enables new architecture that substantially reduces circuit complexity and costs.

In addition, this invention utilizes an entirely binary-coded decimal (BCD) system to address the read-only memory which essentially functions as a BCD to sinusoidal function conversion table. The use of an entirely BCD front-end serves to reduce the complexity of the circuit over the circuits presented by Jackson and Tierney, et al. The BCD front-end and the storage of an entire period also enables the use of an industry standard frequency reference, such as 10 Mhz, rather than the 8 Mhz frequency reference used by Jackson, which is non-standard in the instrumentation industry.

The instrumentation industry is pertinent to this invention because frequency synthesizers of the type disclosed herein are most frequently used in or with instrumentation, the vast majority of which have a 10 Mhz internal clock or provide 10 Mhz as an excitation frequency. 10 Mhz is the industry standard for electronic instrumentation requiring accurate frequency synthesis, such as, frequency synthesizers, counters, spectrum analyzers and network analyzers.

The Jackson and the Tierney, et al., devices are inherently limited to source frequencies evenly divisible by 4, such as the 8 Mhz preferred by Jackson, because their front-ends are not entirely BCD and because they store only a symmetrical portion of a sinusoidal function, not the entire function. With a reference frequency of 10 Mhz, their resolution would be an odd number adding distortion.

A further advantage of this invention is that an entire sinusoidal function is stored in the ROM and used during the synthesis. This has the effect of a substantial reduction in circuit complexity.

Other advantages and attributes of this invention will be readily discernible upon a reading of the text hereinafter.

SUMMARY OF THE INVENTION

This invention firstly presents N stages of BCD adders which receive as a first addend BCD encoded information representing the desired frequency, and which receive as a second addend the outputs of N stages of four-bit registers. The data clocked into the registers by the stable frequency source comes from the sum outputs of the BCD adders. The outputs from a plurality of the most significant stages of the registers are used as the address for the ROM. Using the BCD address, a sample of a sinusoidal wave function is retrieved from the ROM in digital form. A digital-to-analog converter (DAC) is used to convert the digitized sample into a corresponding analog signal. A low-pass filter enhances the desired frequency and suitably attenuates higher frequencies. The signal from the low-pass filter is passed through an equalizer which compensates for roughly a (sine x)/x power roll-off which occurs near and at the high end of the bandwidth of this device.

An object of this invention is to present a digital frequency synthesizer which performs the same of similar functions as those currently available in the art but with greatly reduced circuitry and complexity.

A further object of this invention is to present a digital frequency synthesizer which is adapted to use, as the basic frequency source, a frequency most commonly found and used in the instrumentation industry, namely 10 Mhz.

Other objects of this invention will be readily apparent upon a reading of the specification.

DESCRIPTION OF PREFERRED EMBODIMENT

Figures 1, 2:
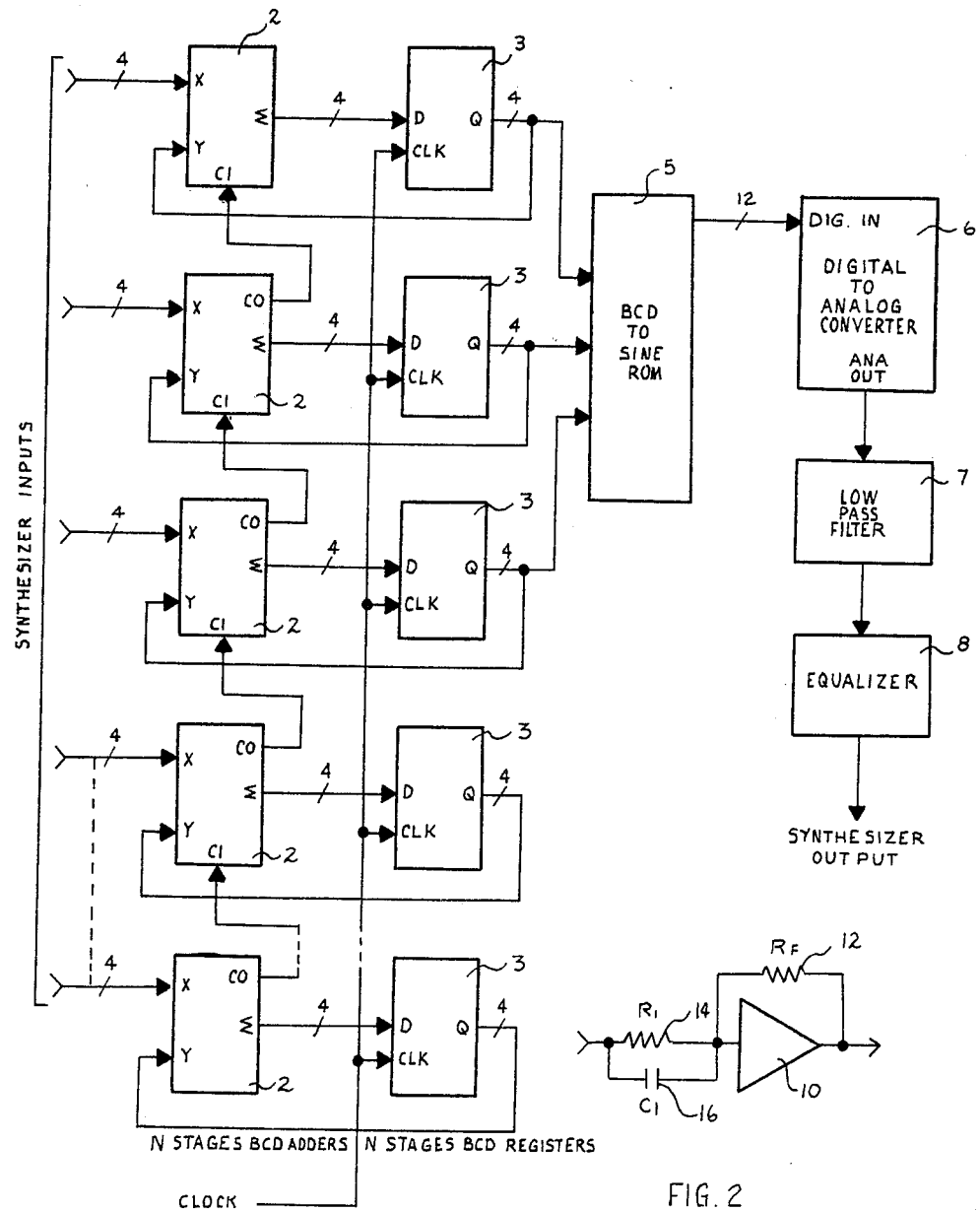
FIG. 1 is a functional block diagram of this invention.
FIG. 2 is a circuit diagram of one embodiment of the equalizer.

Referring to FIG. 1, N stages of BCD adders 2 are shown. The adders 2 each have a first addend input designated "X", a second addend input designated as "Y", a summing output designated as "Σ", and a carry input and output designated as "CI" and "CO", respectively. Each adder stage adds two single digits, decimal based numbers with a carry, if any, to produce a single digit, decimal based sum.

The adders 2 receive at their X inputs as a first addend, BCD encoded information from synthesizer inputs (not shown). The inputs can be any form of input, such as switches, dials, and even a data word from another device such as a computer. The number of significant decimal digits in an input number must be less than or equal to the number of adder stages.

The slash and the numeral "4" associated with each input line means that the line shown actually comprises four separate input lines. Likewise, any shown line having a slash and a numeral proximate to the slash means that the shown line actually comprises a number of separate lines equal to the numeral.

The summing outputs of the adders 2 are communicated to data inputs (designated "D") of N stages of four-bit registers 3. Information present at the D inputs of the registers 3 are clocked into the registers by a clock signal being sourced by a conventional stable frequency source. The clock preferably has a frequency of 10 Mhz. Shortly after the data is clocked into the registers 3, it appears at the outputs (designated "Q") of the registers 3.

The Q outputs of the registers 3 are fed back to the Y inputs of the adders 2 as a second addend. Thus, at times between clocks, the summing outputs of the adders 2 represent the sum of the synthesizer inputs and the current state of the registers 3. Each time the registers 3 are clocked, that sum is loaded into the registers and supplants the previous contents of the registers. Since the synthesizer inputs are BCD encoded and the adders are BCD adders, the output of the registers will also be BCD encoded information. The outputs from a plurality of the most significant stages of the registers 3 are used as address information for a ROM 5, i.e. each stored sum is effectively truncated by some number of decimal digits from its least significant end, and the truncated stored sum is used as an address for the ROM.

Preferably the ROM 5 is a binary addressable ROM and the 3 most significant decimal digits are used as the ROM address. Since 3 BCD digits comprise 12 binary digits, the ROM 5 has 4,096 separately addressable data locations. However, only 1,000 samples need to be stored because the 3 decimal digits taken together have a range of only 0 to 999. Therefore, unless the ROM is specifically configured to be a BCD addressable ROM, there will be approximately 3,096 unused data locations. In the prior art it was prohibitively expensive to so under-utilize a ROM, but this invention makes use of relatively inexpensive and relatively large-scale ROM's such as an AMD 27S41, a Signetics 82S195 or a Fujitsu MB7152. A complete period of a sinusoidal function is stored in the ROM 5 as 1,000 samples.

The output of the ROM 5 is a series of digitized samples of a sinusoidal function, preferably of 12 bits accuracy. The digitized samples are communicated to a digital-to-analog converter 6 (DAC). The DAC converts a digital signal to an analog signal, the level of which corresponds to the value of the digital signal. Preferably the DAC 6 is 12 bit DAC such as an A/D HDD106 or a DATEL DACHF12.

The output of the DAC 6 is communicated to a low-pass filter 7 (LPF) to remove unwanted high frequency components. Preferably the LPF is an active or passive filter such as 7 pole Chebyshev or elliptical filter, for example a TTE J85E. The output of the LPF 7 is communicated to an equalizer 8. The equalizer 8 serves to compensate for a loss of power at the high-end of the bandwidth of the LPF 7. The loss of power follows approximately a (sine x)/x function. FIG. 2 shows an example of such an equalizer. It compromises an operational amplifier 10, a feedback resistor 12 ($R_F$) and and input circuit comprising an input resistor 14 ($R_I$) in parallel with a capacitor 16 ($C_I$).

The voltage out of the circuit FIG. 2 follows the voltage in by the function $$V_O = -(R_F/Z_I)V_I$$

where $Z_I$ is the impedance of the input circuit of $R_I$ and $C_I$. As can be seen $Z_I$ will decrease as the frequency of the input signal increases. By selecting suitable values for the passive components, the gain of the equalizer 8 will begin to increase at or near the point at which the power roll-off begins to occur.

The foregoing description was given for illustrative purposes only and no unnecessary limitations in the claims should be drawn therefrom.

I claim:

1. A synthesizer of a periodic signal of selectable frequency comprising:
    (a) a means for adding two binary-coded decimal addends, the sum of the two addends being a binary-coded decimal number,
    (b) a means for remembering a binary-coded decimal number derived from and uniquely corresponding to a selected synthesizer output frequency, and continuously applying said decimal number as a first addend to said adding means,
    (c) a means for storing said sum from said adding means in response to a clock signal, the stored sum being fed back to the adding means as a second addend,
    (d) a means for providing the form of a signal being synthesized expressed as a ordered set of digitized samples of the signal, the samples being provided in response to stored sums in truncated form, one sample provided per truncated stored sum, the value of each sample so provided corresponding to a magnitude of said signal at the point in time that said sample is provided,
    (e) a means for providing to the sum storing means a train of clock signals,
    (f) a means for converting the provided samples to corresponding analog levels, and
    (g) a means for filtering the analog levels to produce a generally continuous signal of the selected frequency.

2. The synthesizer according to claim 1 wherein the means for storing the sums comprises a register having a plurality of decimal digit stages.

3. The synthesizer according to claim 1 wherein the means for providing the samples comprises a memory having stored therein the form of the signal being synthesized, the form being expressed as a set of digitized samples of the magnitude of the signal, the samples being uniformly spread over a full cycle of the signal, the samples being stored in order in said memory at arithmetically progressive, binarycoded decimal addresses and each sample being individually recallable in response to its corresponding address.

4. The synthesizer according to claim 3 wherein the means for storing the sums comprises a register having a plurality of decimal digit stages.

5. A synthesizer of a periodic signal of selectable frequency comprising:
    (a) a memory having stored therein the form of the signal being synthesized, the form being expressed as a set of digitized samples of the magnitude of the signal, the samples being uniformly spread over a full cycle of the signal, the samples being stored in order in said memory at arithmetically progressive, binary-coded decimal addresses and each sample being individually recallable in response to its corresponding address, (b) a binary-coded decimal adder having inputs for two addends, the sum of the two addends being a binary-coded decimal number, the addends and the sum each having some number N decimal digits, (c) a means for remembering a binary-coded decimal number derived from and uniquely corresponding to a selected synthesizer output frequency, and continuously applying said decimal number as a first addend to said adding means, (d) a storage register for storing the sum from the adder in response to a clock signal, the stored sum being fed back to the adder as a second addend, each stored sum being communicated in truncated form to the memory as an address for recalling a sample, (e) a digital to analog converter for coverting each sample recalled from the memory to a corresponding analog level, (f) a source of a uniform train of clock signals which are communicated to the storage register, and (g) a filter for removing undesirable frequency components from the analog levels to produce a generally continuous signal of the selected frequency.

6. The synthesizer according to claim 5 wherein the samples are stored in said memory at successive addresses and the number of samples is equal to the number ten raised to a power equal to the number of decimal digits in a memory address.

7. The synthesizer according to claim 5 wherein the memory is a binary addressable memory in which the samples are stored only in those portions of the memory addressable by a binary-coded decimal address.

* * * * *